(12) United States Patent
Simpson

(10) Patent No.: US 7,730,173 B2
(45) Date of Patent: Jun. 1, 2010

(54) DETECTING NEARBY DEVICES IN A NETWORK ENVIRONMENT

(75) Inventor: Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2026 days.

(21) Appl. No.: 09/928,192

(22) Filed: Aug. 10, 2001

(65) Prior Publication Data

US 2003/0033389 A1 Feb. 13, 2003

(51) Int. Cl.
*G06F 15/173* (2006.01)
*G06F 15/16* (2006.01)

(52) U.S. Cl. .................. 709/224; 709/223; 709/226; 709/229

(58) Field of Classification Search .......... 709/202, 709/203, 205, 218, 220, 228, 208, 217, 225, 709/223, 224, 226, 229
See application file for complete search history.

(56) References Cited

U.S. PATENT DOCUMENTS

| | | | |
|---|---|---|---|
| 5,548,722 A * | 8/1996 | Jalalian et al. ............. 709/220 |
| 5,555,376 A * | 9/1996 | Theimer et al. ............. 709/229 |
| 5,603,054 A * | 2/1997 | Theimer et al. ............. 710/6 |
| 5,611,050 A * | 3/1997 | Theimer et al. ............. 709/202 |
| 5,812,865 A * | 9/1998 | Theimer et al. ............. 709/228 |
| 6,088,120 A * | 7/2000 | Shibusawa et al. ......... 358/1.15 |
| 6,151,134 A * | 11/2000 | Deppa et al. ............. 358/1.15 |
| 6,370,592 B1 * | 4/2002 | Kumpf ..................... 719/328 |
| 6,665,714 B1 * | 12/2003 | Blumenau et al. .......... 709/222 |
| 6,957,276 B1 * | 10/2005 | Bahl ....................... 709/245 |
| 7,085,763 B2 * | 8/2006 | Ochiai et al. ............. 1/1 |
| 2003/0011805 A1 * | 1/2003 | Yacoub .................... 358/1.15 |
| 2003/0025939 A1 * | 2/2003 | Jeran et al. ............... 358/1.16 |
| 2003/0038965 A1 * | 2/2003 | Simpson et al. ........... 358/1.15 |
| 2003/0055874 A1 * | 3/2003 | Simpson et al. ........... 709/203 |

OTHER PUBLICATIONS

"Definitions of Managed Objects," Network Work Group Request for Comments: 1493, Jul. 1993, pp. 1-34.

* cited by examiner

Primary Examiner—Ramy M Osman
Assistant Examiner—Sargon N Nano

(57) ABSTRACT

In a networked environment, an inferred proximity of one or devices to another device is determined. The inferred proximity is determined, for a particular one of the one or more devices, based at least in part on which port of a network switch the particular device and the other device are coupled to.

31 Claims, 6 Drawing Sheets

DETECTING NEARBY DEVICES IN A NETWORK ENVIRONMENT

TECHNICAL FIELD

This invention relates to computer network topology determination, and more particularly to detecting nearby devices in a network environment.

BACKGROUND

As computer technology has advanced the number of computers being used, as well as the tasks these computers are being used to perform, has increased. Accompanying this increased computer usage has been an increase in the interconnectivity of computers. A wide variety of networking devices, such as switches and hubs, have become increasingly commonplace in businesses, educational facilities, and homes. These networking devices allow data to be transferred among the computers that are coupled to the devices, as well as to other devices that are coupled to the network, such as printers, scanners, etc.

Although there are many benefits to interconnecting devices via a network, there are also problems created by networking devices together. One such problem is the wide variety of devices accessible to the user of computer. For example, where the computer user once had a single printer attached to his or her computer, he or she now has multiple networked printers to which he or she can print. While this provides more options to the user, it can also make things difficult for the user because he or she typically must identify which one of the printers to print to. And, while the user typically desires to print to the printer closest to him or her, there is often times little, if any, indication given to the user as to which printer is closest.

One solution to this problem is to have devices named in such a way that their names reflect their locations. For example, printers may be given names that indicate which floor of the building they are on, whose office they are close to, and so on. This solution, however, also has problems which can make is user-unfriendly. Those problems include: the subjective nature of the device naming process, the need for human input into the device naming process, the need to rename a device if the device is moved, and the need for a user of a computing device to understand locations reflected in the names (for example, if the device name reflects that the device is close to Bob's office, then the user needs to know the location of Bob's office).

Thus, a need exists for a more user-friendly way in which to identify devices on a network that are nearby a particular computer (or other device).

SUMMARY

Detecting nearby devices in a networked environment is described herein.

For each of one or more devices in a network, an inferred proximity of the device to another device (for example, a computing device) is determined based at least in part on which port of a network switch the device and the other device are coupled to.

DETAILED DESCRIPTION

Detection of nearby devices in a network environment is described herein. The detection of devices near to a particular computing device is accomplished by discovering one or more switches that the computing device is coupled to. Information is obtained from these switches identifying devices that are coupled to particular ports of each switch. This information is then used to infer how near a device is to the computing device.

The discussions herein make reference to both network hubs and network switches (also commonly referred to as simply "hubs" and "switches"). Hubs and switches are both networking devices having multiple ports and that route data among the various devices coupled to the hub or switch by transmitting data out on one port (or ports) that has been received by the hub or switch on another port. The primary difference between a hub and a switch is the manner in which they identify which one or more ports to transmit data out of. A switch maintains a record of which devices are coupled to each of the switch's ports. Thus, when data is received that targets a particular device, the switch identifies which port the targeted device is coupled to and transmits the received data out on that identified port (but does not transmit the received data out on any other of the switch's ports). A hub, however, maintains no such record. Rather, any data received by the hub on a particular port is transmitted out on all other ports of the hub without regard for where the targeted device is located.

Figure 1:
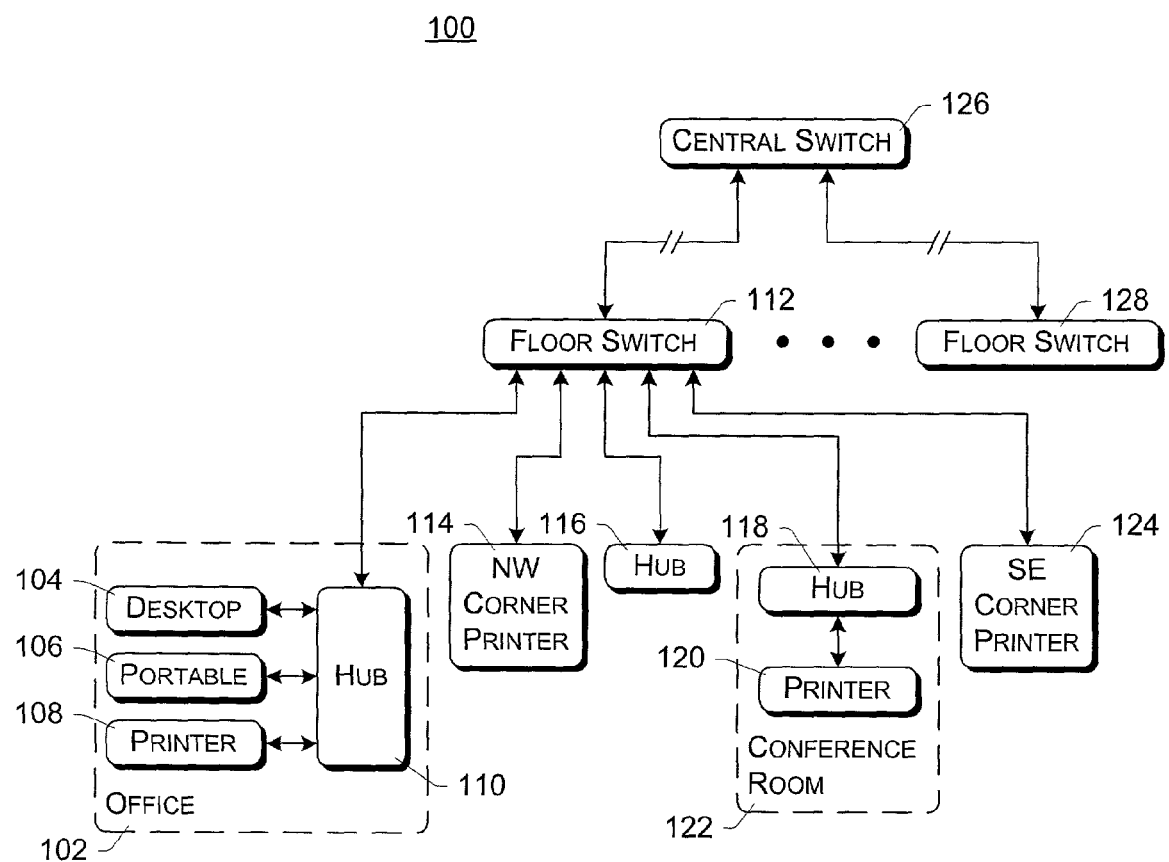
FIG. 1 illustrates an exemplary network environment in which nearby devices can be detected.

FIG. 1 illustrates an exemplary network environment 100 in which nearby devices can be detected. In network environment 100, an office 102 includes multiple computing devices (a desktop computer 104 and a portable computer 106) and a printer 108 coupled to a hub 110. The hub 110 is coupled to a switch 112, which is further coupled to another printer 114, another hub 116, another hub 118 that is coupled to a printer 120 in a conference room 122, yet another printer 124, and a central switch 126 that is further coupled to another switch 128. Many additional devices may also be included in network environment 100, however, these have not been shown in order to avoid cluttering the drawings.

Network environment 100 is organized in a hierarchical manner with networking devices located at multiple different hierarchical levels. Hubs 110, 116, and 118 are situated at the lowest level, while floor switches 112 and 128 are situated at the next higher level. A top-level switch 126 is at the highest level and, although not shown, one or more additional levels (including hubs and/or switches) may also exist between switch 126 and switches 112 and 128. In the example environment 100, the network is implemented with one floor switch 112, 128 for each floor of a building. These floor switches 112, 128 are coupled to the central switch 126 (optionally via one or more additional hubs and/or switches).

The user of computer 104 or 106 will typically want to print to printer 108 because printer 108 is located in the same office as the user. However, the user may also take portable computer 106 to conference room 122, plugging in (or otherwise connecting) computer 106 to hub 118. If the user desires to print from computer 106 while it is located in conference room 122, the user will typically want to print to the closest printer, which is printer 120.

In order to identify which device in network environment 100 to use (for example, which printer to print to), a device detection process is employed to infer how close one or more of the devices in network environment 100 is to the computing device desiring to use the device. For example, while portable computer 106 is located office 102, the device detection process indicates that the printer 108 is closer to the computer 106 than printer 114, printer 120, or printer 124. However, when portable computer 106 is located in conference room 122, the device detection process indicates that the printer 120 is closer to computer 106 than printer 108, printer 114, or printer 124.

Network environment 100 can be implemented in any of a wide variety of conventional manners. Couplings between devices can be wired (e.g., coax cable, fiber-optic cable, twisted pair, etc.) or wireless (e.g., RF, infrared, etc.), and can use any of a wide variety of conventional networking protocols (e.g., TCP/IP, NetBEUI, IPX/SPX, etc.).

Figure 2:
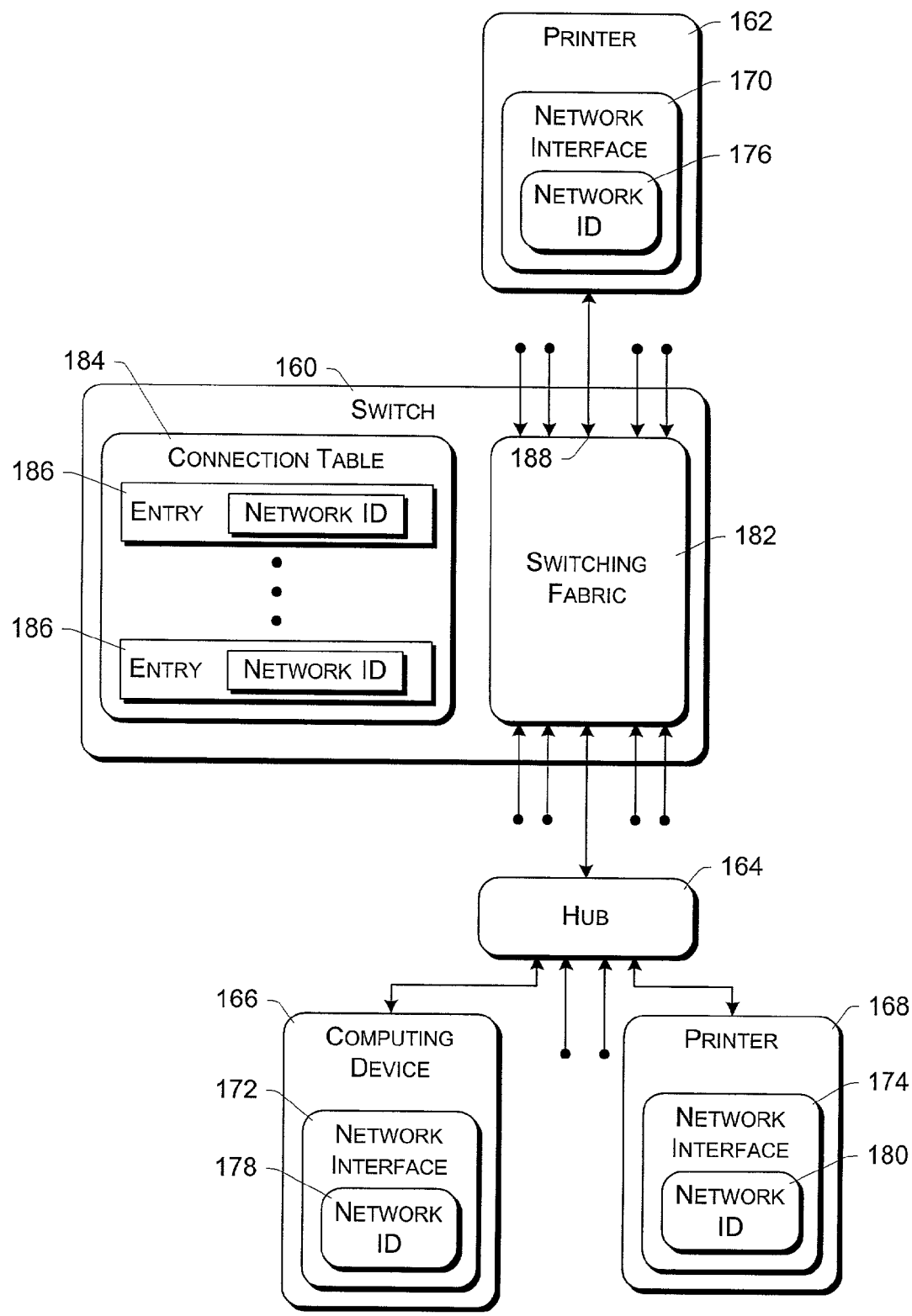
FIG. 2 is a more detailed block diagram illustrating a portion of networking environment 100 of FIG. 1.

FIG. 2 is a more detailed block diagram illustrating a portion of networking environment 100 of FIG. 1. A switch 160 is illustrated coupled to a printer 162 and a hub 164, which is further coupled to a computing device 166 and another printer 168. The components of FIG. 2 represent a variety of different components in FIG. 1. For example: switch 160 can be floor switch 112 of FIG. 1, hub 164 can be hub 110 of FIG. 1, computing device 166 can be one of devices 104 or 106 of FIG. 1, printer 168 can be printer 108 of FIG. 1, and printer 162 can be printer 114 or 124 of FIG. 1. Each device 162, 166, and 168 includes a network interface 170, 172, and 174, respectively, that allows the device to communicate with other devices in the network. Each of the interfaces 170, 172, and 174 farther includes a network ID 176, 178, and 180, respectively, that uniquely identifies the corresponding network interface and thus the corresponding device on the network. Any of a wide variety of conventional identifiers can be used as network ID 176, 178, and 180, such as a hardware or MAC address, IP address, etc.

Switch 160 includes a switching fabric 182 and a connection table 184. Switching fabric 182 has multiple connection points or ports, one of which is connected to network interface 170, another of which is connected to hub 164, and unconnected ports are illustrated with terminating circles. Switching fabric 182 is responsible for receiving incoming network communications (e.g., data packets) from a connected device and routing them appropriately. Connection table 184 maintains a record of which devices are coupled to switch 160. The devices are identified in table 184 by their respective network ID's, which are stored as entries 186 in table 184.

Switching fabric 182 uses the information stored in connection table 184 to perform the routing of received data. For example, if computing device 166 desires to print to printer 168, a print request (which identifies the network ID of printer 168 as the target device) is communicated from computing device 166 to hub 164 which in turn communicates the request out on all other ports of hub 164. The print request is thus received by printer 168 as well as switching fabric 182. Switching fabric 182, based on connection table 184, determines that the network ID of the targeted device (network ID 180 of printer 168) is connected to the same port of switching fabric 182 as the print request was received on, and thus that the print request need not be transmitted out on any other port of fabric 182. However, if computing device 166 desires to print to printer 162, a print request is communicated from computing device 166 to hub 164 which in turn communicates the print request out on all other ports of hub 164. The print request is thus received by printer 168 (which ignores the request as it is not the targeted device) as well as switching fabric 182. Switching fabric 182, based on connection table 184, determines that the network ID of targeted device (network ID 176 of printer 162) is connected to a port 188 of switching fabric 182. Thus, switching fabric 182 communicates the received print request to printer 162 by transmitting the print request out on port 188 (but not on any other port of fabric 182).

Figure 3:
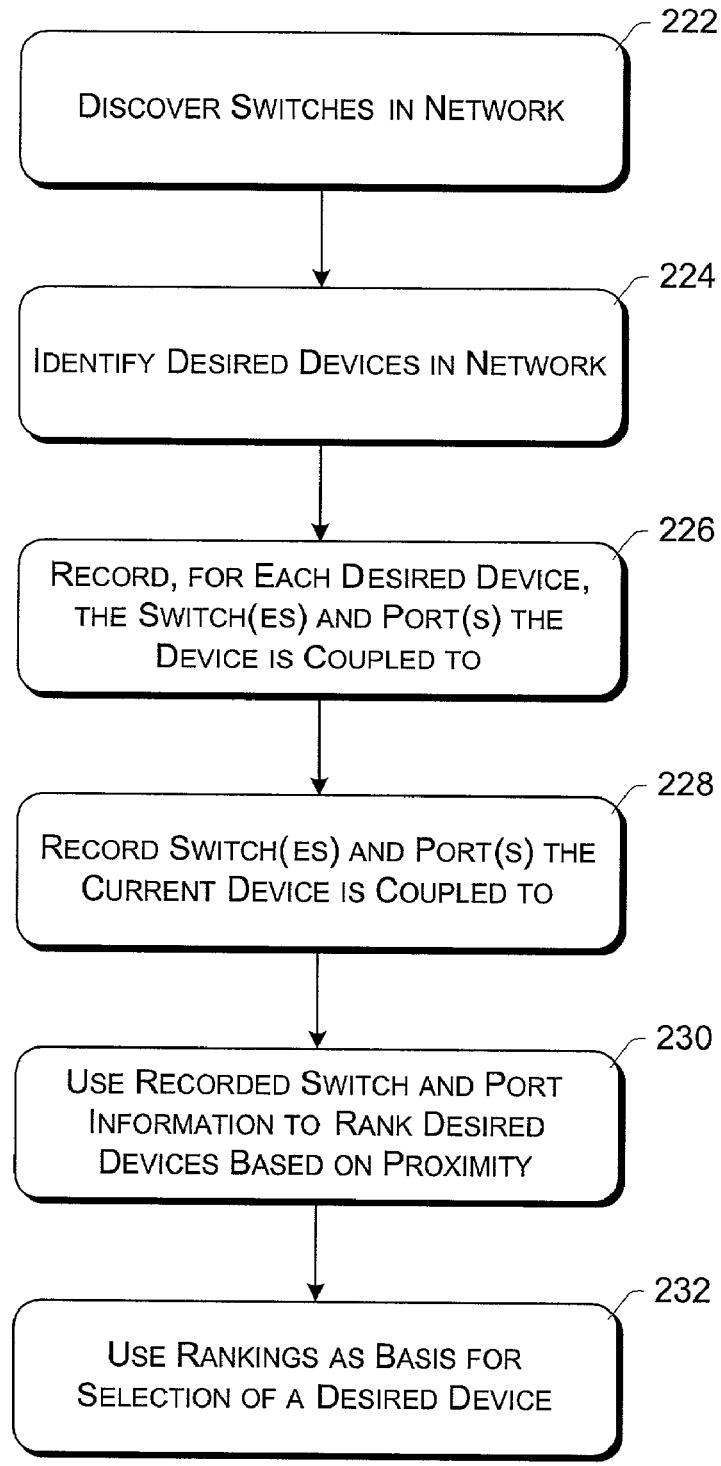
FIG. 3 is a flowchart illustrating an exemplary process for detecting nearby devices in a network environment.

FIG. 3 is a flowchart illustrating an exemplary process 220 for detecting nearby devices in a network environment. The process of FIG. 3 is carried out by a computing device in the network environment, typically the computing device for which detection of nearby devices is desired. In one implementation, the process of FIG. 3 is performed in software. The process of FIG. 3 can be carried out at different times, such as at preset (or random) intervals, when the device is powered on or reset, when the device is initially connected to a network, when the network device that the computing device is directly connected to is changed (e.g., the computing device is moved and connected to a different hub), at the user's request, and so forth.

Initially, the switches in the network are discovered (act 222). The switches in the network can be discovered using any of a variety of well-known discovery protocols. For example, SNMP (simple network management protocol) provides a mechanism by which devices possessing an SNMP agent (which switches usually do) can be discovered. After the switches in the network have been discovered, the devices of the desired type on the network are identified (act 224). Any of variety of different types of devices can be detected by the process of FIG. 3, such as printers, scanners, and so forth. In one implementation, the device performing the process of FIG. 3 has access to a list of network ID's (or alternatively other identifiers) of the desired devices in the network (for example, from a file stored at the device or alternatively elsewhere in the network). In another implementation, the device performing the process of FIG. 3 queries multiple addresses on the network (e.g., each address in the same subnet as the device's address). This querying process identifies both whether a device currently exists on the network with a particular address as well as the type of device at that address.

Once the switches and desired devices have been detected, each switch as well as which port of each switch that each desired device is coupled to is recorded (act 226). The switch and port information for each desired device is obtained from the connection tables of the switches in the network. Additionally, each switch and which port of each switch that the current device (the device for which the nearby desired devices are being detected) is coupled to is also obtained from the connection tables of the switches in the network and recorded (act 228). The switch and port information for a device can be obtained from the switches in any of a variety of manners, such as using the protocol described in Internet Engineering Task Force's (IETF) Request for Comments (RFC) 1493, entitled "Definition of Managed Objects for Bridges". Additional information regarding switch detection and device selection can be found in co-pending U.S. patent application Ser. No. 09/730,074, filed Dec. 4, 2000, entitled "Selection of a Candidate Peripheral Device", to inventor Shell S. Simpson, which is hereby incorporated by reference.

Using this recorded switch and port information, the desired devices are ranked based on their inferred proximity to the computing device (act 230). Inference is made as to the proximity of a desired device to the current device based on which port of the switch the devices are coupled to as well as how many other devices (whether or not of the same type as the desired device) are also coupled to that port. The rankings are then used as a basis for selection of one of the desired devices (act 232). This can be an automated selection (e.g., automatically select the closest printer (or randomly select one of the closest printers if there is more than one) to the user as his or default printer), or alternatively the rankings may be presented to the user to allow him or her to select one of the devices.

Figure 4:
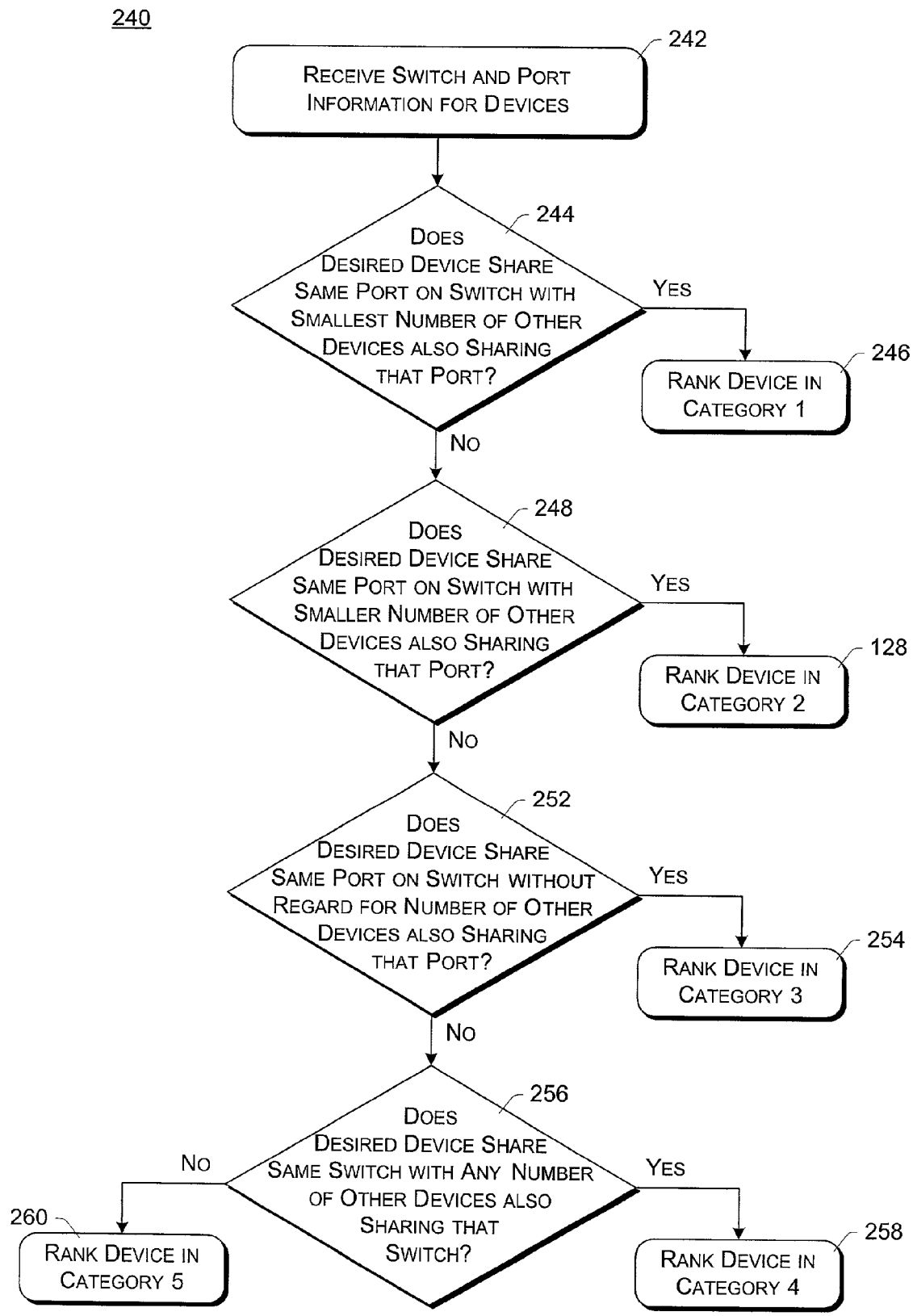
FIG. 4 is a flowchart illustrating an exemplary process for determining, based on the recorded switch and port information, the relative proximity of multiple desired devices.

FIG. 4 is a flowchart illustrating an exemplary process 240 for determining, based on the recorded switch and port information, the relative proximity of multiple desired devices. The process of FIG. 4 is carried out by a computing device in the network environment, typically the computing device for which detection of nearby devices is desired. In one implementation, the process of FIG. 4 is performed in software. The process of FIG. 4 ranks devices into one of up to five different categories, with devices in a lower number category being closer to the computing device than devices in a higher number category (with category 1 being the closest devices and category 5 being the furthest devices). Situations can arise where a desired device can be ranked in multiple different categories. In such situations, the desired device is ranked in the lowest numbered category of those multiple categories.

Initially, the discovered switch and port information for the devices is received (act 242). This includes the switch and port information for the desired device(s) from act 226 of FIG. 3 as well as the switch and port information for the current device from act 228 of FIG. 3. One or more of the following acts (act 244-act 260) are performed for each desired device. A check is made as to whether the desired device shares the same port on the switch as the current device and with the smallest number of other devices also sharing that port (act 244). If so, the device is determined to be one of the closest devices and is ranked in category 1 (act 246). If not, a check is made as to whether the desired device shares the same port on the switch as the current device and with a smaller number of other devices also sharing that same port (act 248). If so, the device is determined to be one of a set of one or more second closest devices and is ranked in category 2 (act 250). If not, a check is made as to whether the desired device shares the same port on the switch as the current device without regard for the number of other devices also sharing that port (act 252). If so, the device is determined to be one of a set of one or more third closest devices and is ranked in category 3 (act 254). If not, a check is made as to whether the desired device shares the same switch as the current device with any number of other devices also sharing that same switch (act 256). If so, the device is determined to be one of a set of one or more fourth closest devices and is ranked in category 4 (act 258), and if not the device is determined to be one of a set of one or more fifth closest devices (or furthest devices) and is ranked in category 5 (act 260). It is to be appreciated that the discovery of switch and port information may not always be a perfect process (e.g., a root switch might not be discovered or might not allow the client to access its SNMP agent), and thus act 260 is included in process 240. Alternatively, in embodiments where such uncertainty or imperfection does not exist, process 240 may not include act 260.

The process of FIG. 4 can be explained by way of example with reference to network environment 100 of FIG. 1. Assume that the desktop computer 104 in office 102 of FIG. 1 desires to detect nearby printers and employs the process of FIG. 4. Printer 108 shares the same port on switch 112 as computer 104, so printer 108 shares the same port on switch 112 with the smallest number of other devices also sharing that port and thus is ranked in category 1. This is so even though printer 108 also shares the same port on switch 126 as computer 104 and various other devices (because the number of other devices sharing that port on switch 126 is larger).

Printers 114, 120, and 124 do not share a port of switch 112 with computer 104, however they do share a port of switch 126 with computer 104. Thus, printers 114, 120, and 124 are ranked in category 2. Alternatively, if there are additional levels of switches between switch 112 and switch 126, then printers 114, 120, and 124 share a port of the switch at the next higher level than switch 112 and are ranked at category 2 based on this switch. Any printers (not shown) connected to switch 128 would share the same switch 126 as computer 104 (but not the same port on switch 126), and thus would be ranked in category 4.

It should be noted that the acts of the processes of FIGS. 3 and 4 can be implemented in different orders than are illustrated in the Figures, and that no required ordering should be implied based on the ordering of the illustrated acts. For example, in FIG. 3 act 226 could be performed prior to, subsequent to, or concurrent with act 228.

Figure 5:
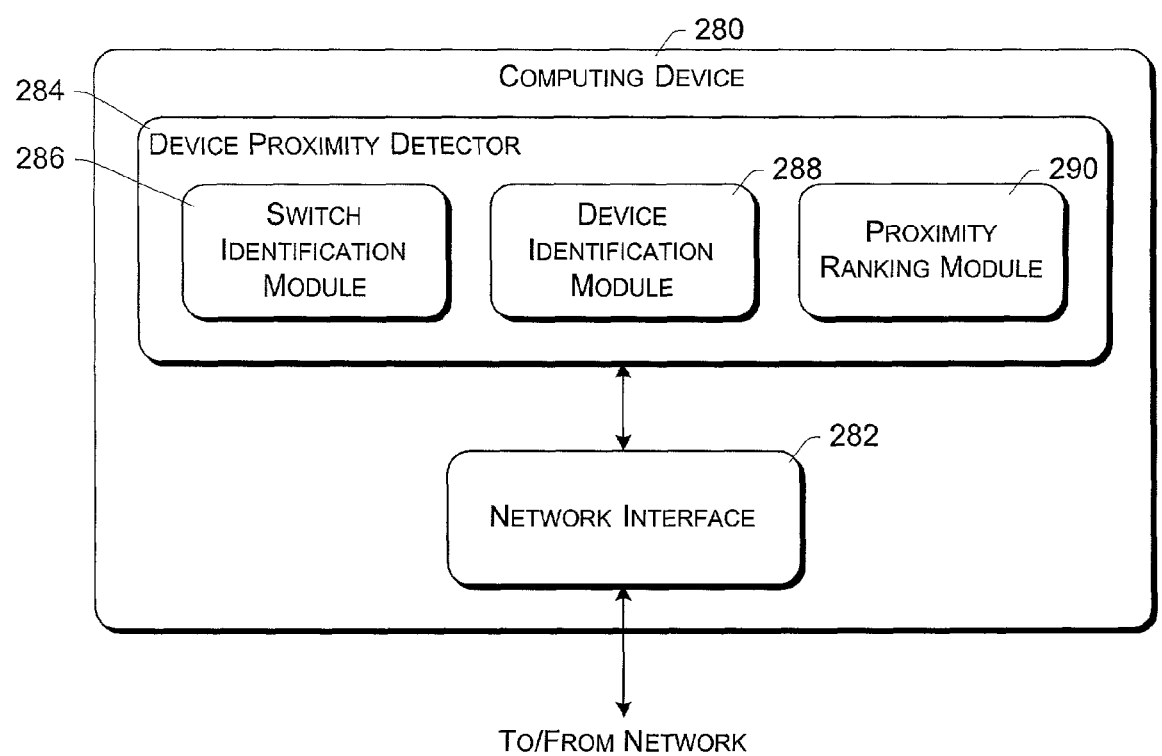
FIG. 5 is a block diagram illustrating an exemplary computing device that detects desired nearby devices.

FIG. 5 is a block diagram illustrating an exemplary computing device 280 that detects desired nearby devices. Computing device 280 includes a network interface 282 analogous to network interfaces 170, 172, and 174 of FIG. 2, via which computing device 280 can communicate with other computing devices via one or more networking devices. Computing device 280 also includes a device proximity detector 284 having a switch identification module 286, a device identification module 288, and a proximity ranking module 290. Switch identification module 286 identifies switches in the network (e.g., performing act 222 of FIG. 3). Device identification module identifies desired devices in the network (e.g., performing act 224 of FIG. 3), and proximity ranking module 290 ranks the proximity of the various identified desired devices (e.g., performing acts 226 and 228 of FIG. 3, and the process 240 of FIG. 4).

Figure 6:
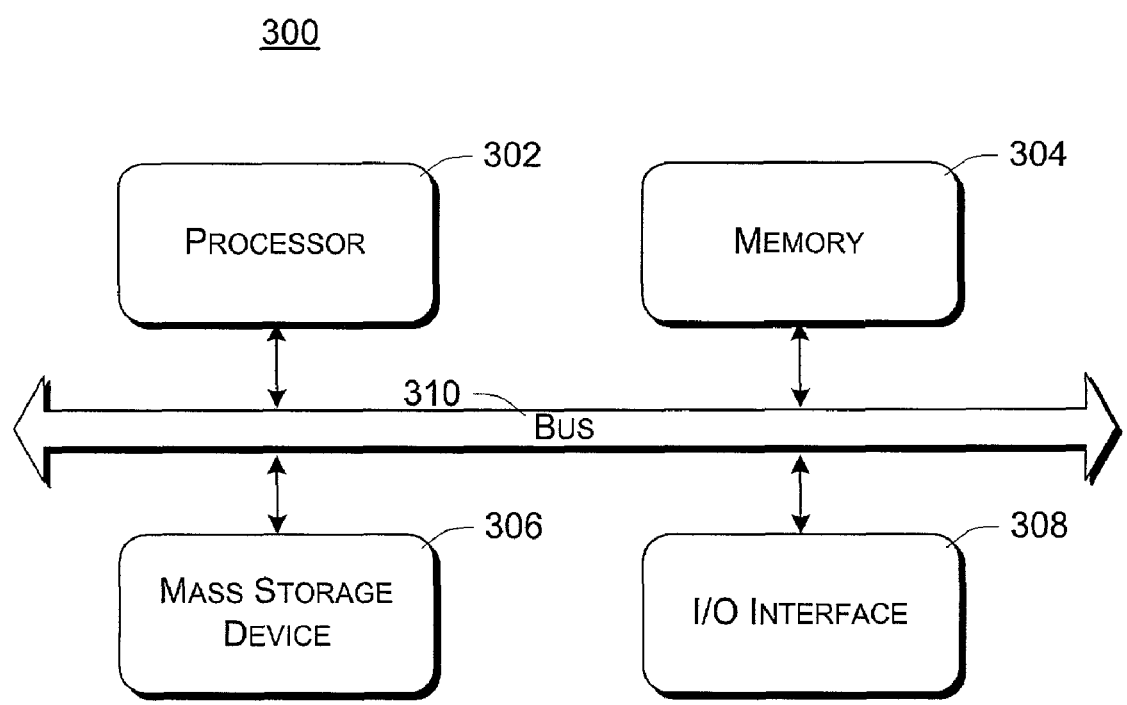
FIG. 6 illustrates an exemplary computer system in additional detail.

FIG. 6 illustrates an exemplary computer system 300 in additional detail. Computer system 300 can be, for example, a desktop computer 104 or portable computer 106 of FIG. 1, a computing device 166 of FIG. 2, a device 280 of FIG. 5, etc. Computer system 300 represents a wide variety of computing devices, such as desktop computers, portable or handheld computers, dedicated server computers, multi-processor computing devices, cellular telephones, personal digital assistants (PDAs), handheld or pen-based computers, microcontroller-based electronic devices, gaming consoles, television set-top boxes, and so forth.

Computer system 300 includes a processor 302, a memory 304, a mass storage device 306 (e.g., a fixed or removable magnetic or optical disk), and an input/output (I/O) interface 308, all coupled to a bus 310. Bus 310 represents one or more buses in computer system 300, such as a system bus, processor bus, accelerated graphics port (AGP), peripheral component interconnect (PCI), and so forth. The bus architecture can vary by computing device as well as by manufacturer. I/O interface 308 is a conventional interface allowing components of system 300 (e.g., processor 302) to communicate with other computing devices via a network. I/O interface 308 may be, for example, a modem, a network interface card (NIC), and so forth.

Memory 304 represents volatile and/or nonvolatile memory used to store instructions and data for use by processor 302. Typically, instructions are stored on a mass storage device 306 (or nonvolatile memory) and loaded into a volatile memory 304 for execution by processor 302. Additional memory components may also be involved, such as cache memories internal or external to processor 302. Various embodiments of the invention may be implemented, at different times, in any of a variety of computer readable media that is part of, or readable by, system 300. For example, such computer readable media may be mass storage device 306, memory 304 or a cache memory, and so forth.

Computer system 300 is exemplary only. It is to be appreciated that additional components (not shown) can be included in system 300 and some components illustrated in system 300 need not be included. For example, a display adapter, additional processors or storage devices, additional I/O interfaces, and so forth may be included in system 300, or mass storage device 306 may not be included.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more non-transitory computer readable media having stored thereon a plurality of instructions that, when executed by one or more processors, causes the one or more processors to perform acts comprising:
    identifying one or more devices in a network;
    obtaining, for at least one of one or more network switches in the network, an indication of which port of the network switch a computing device is coupled to;
    obtaining, for each of the one or more identified devices and for the at least one network switch, an indication of which port of the network switch the identified device is coupled to; and
    determining, for at least one of the one or more identified devices, how physically distant the identified device is to the computing device, wherein the determining is based at least in part on the indication of which port of the network switch the computing device is coupled to and the indication of which ports of the network switch the one or more identified devices are coupled to.

2. One or more computer readable media as recited in claim 1, wherein at least one of the identified one or more devices comprises a printer.

3. One or more computer readable media as recited in claim 1, wherein obtaining an indication of which port of the network switch a computing device is coupled to comprises obtaining the indication from the network switch.

4. One or more computer readable media as recited in claim 1, wherein obtaining an indication of which port of the network switch the identified device is coupled to comprises obtaining the indication from the network switch.

5. One or more computer readable media as recited in claim 1, wherein the determining comprises generating, for at least one of the one or more identified devices, a ranking indicating a proximity of the identified device to the computing device relative to the other identified devices.

6. One or more computer readable media as recited in claim 5, wherein the plurality of instructions further cause to one or more processors to perform an additional act comprising:
    presenting, to a user, each of the generated rankings.

7. One or more computer readable media as recited in claim 1, wherein the computing device comprises both the computer readable media and the one or more processors.

8. One or more computer readable media as recited in claim 1, wherein the computing device comprises both the one or more processors and an I/O device to read the one or more computer readable media.

9. One or more computer readable media as recited in claim 1, wherein determining how physically distant the identified device is to the computing device comprises:
    checking whether the identified device shares the same port on the switch as the computing device and with a smallest number of other devices also sharing the same port; and
    determining, if the identified device shares the same port on the switch as the computing device and with the smallest number of other devices also sharing the same port, that the identified device is one of the physically closest devices to the computing device.

10. One or more computer readable media as recited in claim 9, wherein determining how physically distant the identified device is to the computing device further comprises:
    checking whether the identified device shares the same port on the switch as the computing device and with a smaller number of other devices also sharing the same port; and
    determining, if the identified device shares the same port on the switch as the computing device and with the smaller number of other devices also sharing the same port, that the identified device is a second physically closest device to the computing device.

11. One or more computer readable media as recited in claim 10, wherein determining how physically distant the identified device is to the computing device further comprises:
    checking whether the identified device shares the same port on the switch as the computing device without regard for a number of other devices also sharing the same port; and
    determining, if the identified device shares the same port on the switch as the computing device without regard for the number of other devices also sharing the same port, that the identified device is a third physically closest device to the computing device.

12. One or more computer readable media as recited in claim 11, wherein determining how physically distant the identified device is to the computing device further comprises:
    checking whether the identified device shares the switch with any number of other devices also sharing the switch;
    determining, if the identified device shares the switch with any number of other devices also sharing the switch, that the identified device is a fourth physically closest device to the computing device; and
    determining, if the identified device does not share the switch with any number of other devices also sharing the switch, that the identified device is a fifth physically closest device to the computing device.

13. One or more computer readable media as recited in claim 1, wherein determining how physically distant the identified device is to the computing device comprises:
- if the identified device shares the same port on the switch as the computing device and with a smallest number of other devices also sharing the same port, then determining the identified device is one of the physically closest devices to the computing device;
- otherwise, if the identified device shares the same port on the switch as the computing device and with a smaller number of other devices also sharing the same port, then determining the identified device is a second physically closest device to the computing device;
- otherwise, if the identified device shares the same port on the switch as the computing device and without regard for a number of other devices also sharing the same port, then determining the identified device is a third physically closest device to the computing device; and
- otherwise, if the identified device shares the switch with any number of other devices also sharing the switch, then determining the identified device is a fourth physically closest device to the computing device, and otherwise determining the identified device is a fifth physically closest device to the computing device.

14. A method, implemented in a computing device that is part of a network, the method comprising:
- detecting one or more network switches in the network;
- identifying one or more other devices of a particular type in the network;
- obtaining, for each of the identified one or more other devices and for at least one of the one or more network switches, an indication of which port of the network switch the device is coupled to, wherein the indication is obtained from at least one of the one or more network switches; and
- ranking, based at least in part on the obtained indications as well as which port of the network switch the computing device is coupled to, the one or more other devices in terms of their inferred physical proximity to the computing device.

15. A method as recited in claim 14, wherein the one or more other devices of a particular type comprises one or more printers.

16. A method as recited in claim 14, wherein identifying one or more other devices of a particular type in the network comprises identifying the one or more other devices in the network by accessing a list of device identifiers.

17. A method as recited in claim 14, wherein identifying one or more other devices of a particular type in the network comprises identifying the one or more other devices in the network by querying a plurality of devices on the network to determine, for each of the plurality of devices, whether the device is of the particular type.

18. A method as recited in claim 14, further comprising presenting, to a user, the ranking of at least one of the one or more other devices.

19. A method as recited in claim 14, wherein ranking a device of the one or more other devices comprises:
- checking whether the device shares the same port on a network switch as the computing device and with a smallest number of additional devices also sharing the same port; and
- determining, if the device shares the same port on the network switch as the computing device and with the smallest number of additional devices also sharing the same port, that the device is one of the physically closest devices to the computing device.

20. A method as recited in claim 19, wherein ranking the device of the one or more other devices further comprises:
- checking whether the device shares the same port on the network switch as the computing device and with a smaller number of the additional devices also sharing the same port;
- determining, if the device shares the same port on the switch as the computing device and with the smaller number of the additional devices also sharing the same port, that the device is a second physically closest device to the computing device.

21. A method as recited in claim 20, wherein ranking the device of the one or more other devices further comprises:
- checking whether the device shares the same port on the switch as the computing device without regard for a number of additional devices also sharing the same port;
- determining, if the device shares the same port on the switch as the computing device without regard for the number of additional devices also sharing the same port, that the device is a third physically closest device to the computing device.

22. A method as recited in claim 21, wherein ranking the device of the one or more other devices further comprises:
- checking whether the device shares the switch with any number of additional devices also sharing the switch;
- determining, if the device shares the switch with any number of additional devices also sharing the switch, that the device is a fourth physically closest device to the computing device; and
- determining, if the device does not share the switch with any number of additional devices also sharing the switch, that the device is a fifth physically closest device to the computing device.

23. A method, implemented in a computing device that is a part of a network comprising:
- discovering network switches in a network;
- identifying devices connected to the network;
- determining each switch and each port to which the devices are coupled;
- determining each switch and each port to which a user computer is coupled; and
- ranking the devices based upon their inferred physical proximity to the user computer.

24. The method of claim 23, wherein discovering network switches comprises discovering the network switches using simply network management protocol (SNMP).

25. The method of claim 23, wherein identifying devices comprises identifying printers.

26. The method of claim 23, wherein identifying devices comprises consulting a list of network device identifiers.

27. The method of claim 23, wherein identifying devices comprises querying multiple addresses on the network.

28. The method of claim 23, wherein determining each switch and each port to which the devices and the user computer are coupled comprises obtaining switch and port information from at least one network switch.

29. The method of claim 28, wherein obtaining switch and port information comprises obtaining the switch and port information from a connection table of the at least one network switch.

30. The method of claim 23, further comprising automatically selecting the physically closest device.

31. The method of claim 23, further comprising presenting the rankings to the user.

* * * * *